US012333145B2

(12) United States Patent
Yu et al.

(10) Patent No.: US 12,333,145 B2
(45) Date of Patent: Jun. 17, 2025

(54) PEAK POWER MANAGEMENT IN A MEMORY DEVICE DURING SUSPEND STATUS

(71) Applicant: MICRON TECHNOLOGY, INC., Boise, ID (US)

(72) Inventors: Liang Yu, Boise, ID (US); Jonathan S. Parry, Boise, ID (US); Fumin Gu, San Jose, CA (US); John Paul Aglubat, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 131 days.

(21) Appl. No.: 17/990,126

(22) Filed: Nov. 18, 2022

(65) Prior Publication Data

US 2023/0195312 A1    Jun. 22, 2023

Related U.S. Application Data

(60) Provisional application No. 63/292,002, filed on Dec. 21, 2021.

(51) Int. Cl.
*G06F 3/06* (2006.01)
(52) U.S. Cl.
CPC ............ *G06F 3/061* (2013.01); *G06F 3/0634* (2013.01); *G06F 3/0679* (2013.01)

(58) Field of Classification Search
CPC ...... G06F 3/061; G06F 3/0634; G06F 3/0679; G06F 1/3275; G06F 3/0625; G06F 3/0659; Y02D 10/00; G11C 16/30; G11C 16/08; G11C 16/24
See application file for complete search history.

(56) References Cited

U.S. PATENT DOCUMENTS

| | | | |
|---|---|---|---|
| 2019/0043593 A1* | 2/2019 | Guo | G11C 16/30 |
| 2019/0065086 A1* | 2/2019 | Margetts | G06F 13/1668 |
| 2019/0138233 A1* | 5/2019 | Mun | G06F 3/0679 |
| 2019/0164605 A1* | 5/2019 | Jeong | G06F 13/102 |
| 2020/0217672 A1* | 7/2020 | Deng | G06Q 10/06316 |
| 2021/0109578 A1* | 4/2021 | Umapathy | G06F 1/26 |
| 2021/0109587 A1* | 4/2021 | Mukker | G06F 1/206 |
| 2021/0200481 A1* | 7/2021 | Buxton | G06F 3/0652 |
| 2021/0223851 A1* | 7/2021 | Kim | G06F 1/28 |
| 2021/0349512 A1* | 11/2021 | Guim Bernat | H04L 12/10 |
| 2022/0091649 A1* | 3/2022 | Knoth | G06F 1/28 |
| 2022/0164117 A1* | 5/2022 | Guo | G11C 16/30 |

* cited by examiner

*Primary Examiner* — Nanci N Wong
(74) *Attorney, Agent, or Firm* — Lowenstein Sandler LLP

(57) ABSTRACT

A memory device includes memory dies, each memory die including a memory array and control logic, operatively coupled with the memory array, to perform peak power management (PPM) operations. The PPM operations include causing a memory die to be placed in a suspended state to suspend execution of a first media access operation with a reserved current budget, receiving a set of requests to execute at least a second media access operation during the suspended state, and in response receiving the set of requests, handling the set of requests by implementing current budget arbitration logic with respect to the reserved current budget.

20 Claims, 12 Drawing Sheets

PEAK POWER MANAGEMENT IN A MEMORY DEVICE DURING SUSPEND STATUS

RELATED APPLICATIONS

This application claims the benefit of U.S. Provisional Patent Application No. 63/292,002, filed on Dec. 21, 2021 and entitled "Peak Power Management in a Memory Device During Suspend Status", the entire contents of which are incorporated by reference herein.

TECHNICAL FIELD

Embodiments of the disclosure relate generally to memory sub-systems, and more specifically, relate to peak power management in a memory device during suspend status.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
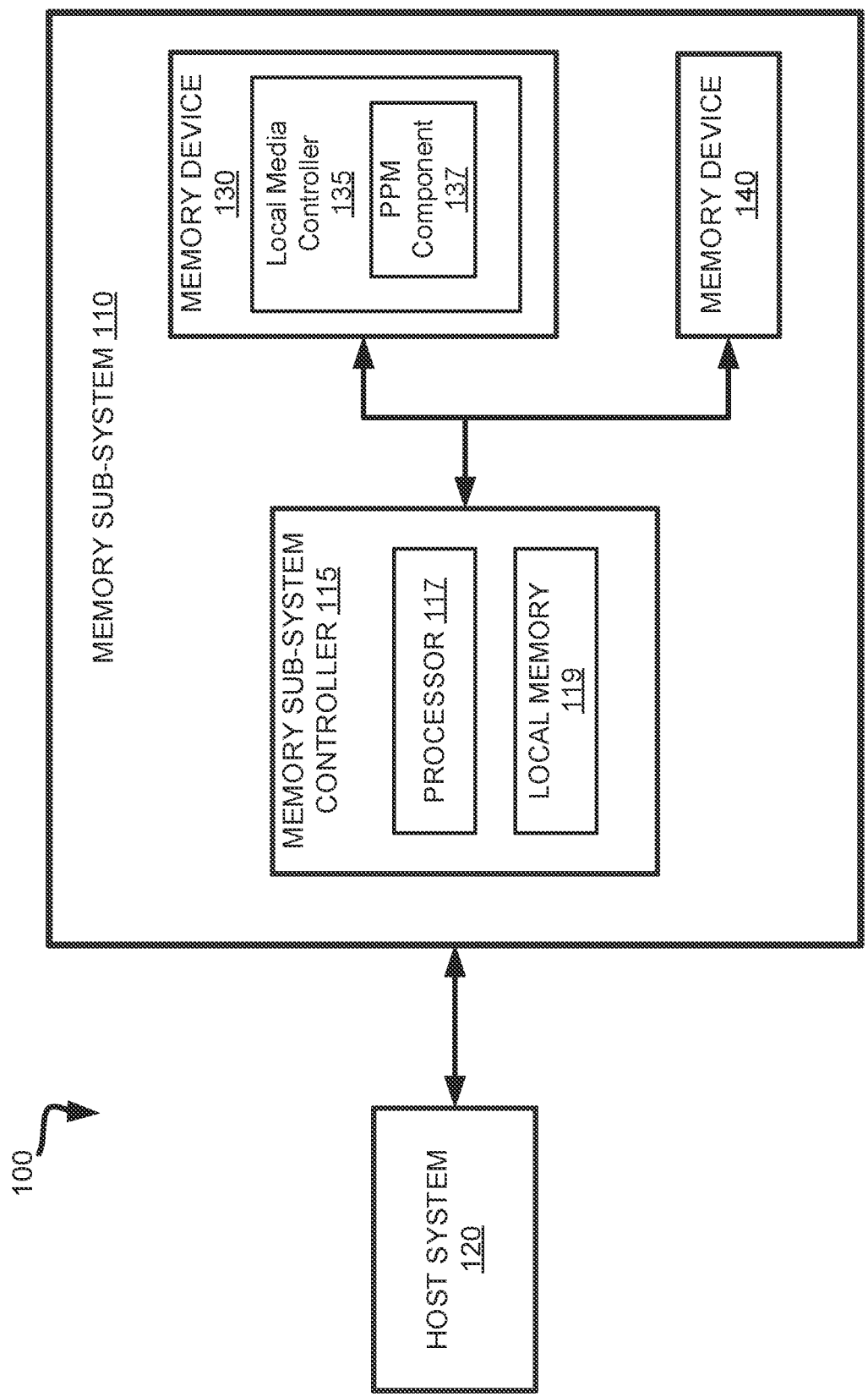
FIG. 1A illustrates an example computing system that includes a memory sub-system in accordance with some embodiments of the present disclosure.

Aspects of the present disclosure are directed to implementing peak power management in a memory device during suspend status. A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIGS. 1A-1B. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can include multiple bits arranged in a two-dimensional or three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types. For ease of description, these circuits can be generally referred to as independent plane driver circuits. Control logic on the memory device includes a number of separate processing threads to perform concurrent memory access operations (e.g., read operations, program operations, and erase operations). For example, each processing thread corresponds to a respective one of the memory planes and utilizes the associated independent plane driver circuits to perform the memory access operations on the respective memory plane. As these processing threads operate independently, the power usage and requirements associated with each processing thread also varies.

A memory device can be a three-dimensional (3D) memory device. For example, a 3D memory device can be a three-dimensional (3D) replacement gate memory device (e.g., 3D replacement gate NAND), which is a memory device with a replacement gate structure using wordline stacking. For example, a 3D replacement gate memory device can include wordlines, select gates, etc. located between sets of layers including a pillar (e.g., polysilicon pillar), a tunnel oxide layer, a charge trap (CT) layer, and a dielectric (e.g. oxide) layer. A 3D replacement gate memory device can have a "top deck" corresponding to a first side and a "bottom deck" corresponding to a second side. For example, the first side can be a drain side and the second side can be a source side. Data in a 3D replacement gate memory device can be stored as 1 bit/memory cell (SLC), 2 bits/memory cell (MLC), 3 bits/memory cell (TLC), etc.

The capacitive loading of 3D memory is generally large and may continue to grow as process scaling continues. Various access lines, data lines and voltage nodes can be charged or discharged very quickly during sense (e.g., read or verify), program, and erase operations so that memory array access operations can meet the performance specifications that are often required to satisfy data throughput targets as might be dictated by customer requirements or industry standards, for example. For sequential read or programming, multi-plane operations are often used to increase the system throughput. As a result, a typical memory device can have a high peak current usage, which might be four to five times the average current amplitude. Thus, with such a high average market requirement of total current usage budget, it can become challenging to operate more than four memory devices concurrently, for example.

A variety of techniques have been utilized to manage power consumption of memory sub-systems containing multiple memory devices, many of which rely on a memory sub-system controller to stagger the activity of the memory devices seeking to avoid performing high power portions of access operations concurrently in more than one memory device. For example, in a memory package including multiple memory devices (e.g., multiple separate dies), there can be a peak power management (PPM) system, where each memory device can include a PPM component configured to perform power or current budget arbitration for the respective memory device. For example, each PPM component can implement predictive PPM to perform predictive power budget arbitration for the respective memory device.

The memory sub-system can employ a token-based round robin protocol, whereby each PPM component rotates (e.g., after a set number of cycles of a shared clock signal) as a holder of the token and broadcasts a quantized current budget consumed by its respective memory device during a given time period. The other PPM components on the other memory devices receive this broadcast information and thus, can determine an available current budget in the memory sub-system during the time period. While holding the token, a PPM component can request a certain amount of current for its respective memory device up to the available current budget in the memory sub-system. The PPM component can employ a number of different techniques to allocate the requested current among the multiple processing threads of the respective memory device.

In some implementations, a die can include multiple processors to handle different commands. More specifically, the processors can include a main processor and at least one coprocessor. For example, the main processor can handle an erase command, a read command, a program command, a suspend command, and a first independent wordline (iWL) read command with respect to a first plane. A first coprocessor can handle a second iWL read command with respect to a second plane, and an N−1-th coprocessor can handle an N-th iWL read command with respect to an N-th plane. That is, the number of total processors of the die can equal the total number of planes. Typically, the current budget is reserved for the main processor, and is not shared or passed to the coprocessors. Therefore, a coprocessor has to wait for current budget allocation from other dies to handle an incoming iWL read command designated to it, which results in a performance penalty.

It can take approximately hundreds of microseconds for a memory device to execute a program operation, which is relatively slower as compared to read operations which can take a memory device approximately tens of microseconds to execute. Generally, a read operation has a higher priority than a program operation. To address such situations, a memory sub-system controller can issue a suspend command to suspend execution of a first media access operation (e.g., programming operation, erase operation) by placing the die can be placed in a suspended state indicated by a suspend status. For example, the suspend status can be a program suspend status, an erase suspend status, or a nested suspend status. Illustratively, if a program operation is currently being executed to program data on a die, and a higher priority read request is received to read out some data from the die, then memory sub-system controller can issue a suspend command to suspend the program operation. While the die is suspended, the memory sub-system controller can issue one or more commands to perform at least a second media access operation. The one or more commands can include at least one of a read command or an iWL read command. After the at least second media access operation completed, the memory sub-system controller can issue a resume command to the die to resume the program operation. Additionally or alternatively, a die can be placed in a suspended state if there is not enough available current budget for the die to perform a media access operation (e.g., read/write/program operation).

Typically, since the die is not actively consuming any power while the first media access operation is suspended, the current budget for the first media access operation can be released to the other active dies. The release can be achieved by the PPM component claiming a current budget of 0 milliamps (mA) upon suspending the media access operation. However, in order to execute the at least second media access operation while the first media access operation is suspended, the PPM component of the suspended die may be forced to wait for at least one other die to release a sufficient amount of current budget for performing the at least second media access operation. This waiting period can introduce a delay impacting performance and Quality of Service (QoS). Moreover, other co-processors may not utilize the released current budget, which can result in additional performance penalties.

Aspects of the present disclosure address the above and other deficiencies by implementing peak power management (PPM) in a memory device during suspend status (e.g., program suspend status, erase suspended status or nested suspend status). For example, the PPM component can receive a request from a host (e.g., from the memory sub-system controller) to reserve current budget for the die while the die is placed in a suspend status corresponding to a suspended state.

In some embodiments, the current budget reservation is implemented using a set feature command during PPM initialization. For example, the PPM can receive a set feature command from the memory sub-system controller to enable the current budget reservation functionality. The request can be sent directly to the PPM component without communicating with the main processor and/or coprocessors of the die. The reserved current budget can be reset upon the suspended die resuming functionality. The PPM current budget reservation scheme descried herein enables coprocessors the ability to access current budget from the main processor.

The amount of reserved current budget can correspond to one or more incoming commands determined (e.g., predicted) to be handled by a die after entering a suspend status to suspend the execution of a media access operation. For example, the suspended media access operation can be a program operation, an erase operation, etc. The one or more incoming commands can correspond to one or more respective media access operations that can be executed while the die is in the suspended state.

More specifically, the amount of reserved power budget can be determined based on a memory sub-system specification that defines one or more incoming commands and/or a target delay, where each incoming command has a corresponding current budget. In some embodiments, the target delay is 0 microseconds. For example, the target delay can be 0 microseconds for an SSD specification. In some embodiments, the target delay is non-zero. For example, the target delay can be non-zero for a Universal Flash Storage (UFS) specification. The target delay can account for situations in which there are additional incoming commands that exceed the reserved current budget predicted for the memory sub-system specification.

Illustratively, assume that a UFS specification defines a target delay of less than 5 microseconds and determines (e.g., predicts) two incoming iWL read commands to be handled by a die while in a suspended state. The two incoming iWL read commands can arrive at the same time (e.g., simultaneous handling), or at different times (e.g., sequential handling). Illustratively, if these two incoming iWL read commands each correspond to a 50 mA request, then the reserved current budget can be set for 100 mA. However, if there are additional incoming commands (e.g., iWL read commands) that would exceed the 100 mA budget defined by the UFS specification, there may be a delay due to having to wait for additional current budget to be released by at least one PPM component of at least one other die. After the one or more incoming commands are handled, execution of the suspended media access operation can resume.

Advantages of the present disclosure include, but are not limited to, improved memory device performance and QoS.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The local media controller 135 can implement a peak power management (PPM) component 137 that can perform PPM in the memory device 130 during a suspend status (e.g., program or erase suspend status). In such an embodiment, PPM component 137 can be implemented using hardware or as firmware, stored on memory device 130, executed by the control logic (e.g., local media controller 135) to perform the operations related to performing PPM during a program/erase suspend status as described herein. In some embodiments, the memory sub-system controller 115 includes at least a portion of PPM component 137. For example, the memory sub-system controller 115 can include a processor 117 (e.g., a processing device) configured to execute instructions stored in local memory 119 for performing the operations described herein.

For example, the PPM component 137 can perform PPM initialization with respect to a memory die ("die") of a multi-die memory device. The PPM initialization can be performed to enable reservation of a current budget for the die. The reserved current budget can be obtained by reserving at least a portion of the previous current budget used by the die prior to being placed in a suspended state to suspend a media access operation (e.g., programming operation, erase operation). However, if the die wants to reserve current budget in excess of the previous current budget, this can introduce delays as the die requests the extra current budget from the other dies. For example, if the previous current budget of the die is 125 mA, and the die wants to reserve 150 mA, then the die will have to request the extra 25 mA to add to the previous current budget from the other dies. Accordingly, to improve efficiency, the maximum current budget that can be reserved by the die can be the previous current budget, such that the reserved current budget is less than or equal to the previous current budget.

Additional current budget reservation restrictions can be provided to enable processing balancing and further improve efficiency among the dies of the multi-die memory device. For example, the maximum current budget that can be reserved can be a percentage of the total current budget for the entire multi-die memory device, which can be based on the total number of dies included in the multi-die memory device. Illustratively, if the multi-die memory device includes 4 dies, then the maximum current budget that can be reserved can be 25% of the total current budget, if the multi-die memory device includes 8 dies, then the maximum current budget that can be reserved can be 12.5% of the total current budget, etc.

In response to receiving at least one incoming command to execute one or more media access operations while the die is in a suspended state (e.g., from the memory sub-system controller 115), the PPM component 137 can cause the die to handle a set of requests based on the reserved current budget. The set of requests can include one or more requests corresponding to a main processor and one or more requests corresponding to one or more coprocessors. In some instances, the reserved current budget is less than the current budget that is needed to handle all of the requests of the set of requests. To address this situation, the PPM component 137 can handle the set of requests by implementing current budget arbitration logic with respect to the reserved current budge. After the set of requests is handled, the PPM component 137 can then resume execution of the suspended media access operation (e.g., in response to receiving a resume command from the memory sub-system controller 115). Further details regarding the operations of the PPM component 137 are described above, and will be described below with reference to FIGS. 5-8.

Figure 1B:
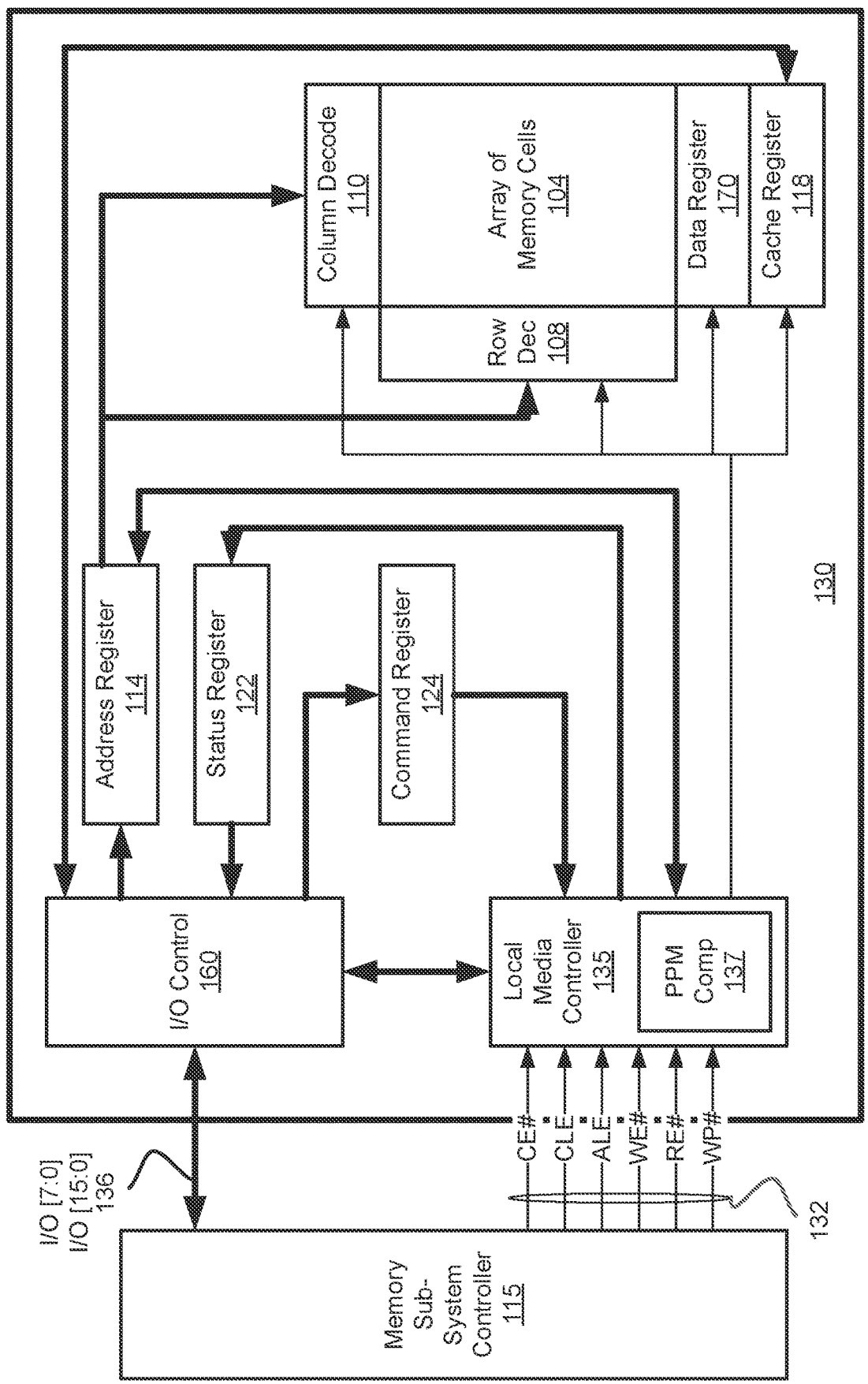
FIG. 1B is a block diagram of a memory device in communication with a memory sub-system controller of a memory sub-system in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 110 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 110 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 110 to control the row decode circuitry 108 and column decode circuitry 110 in response to the addresses. In one embodiment, local media controller 135 includes the PPM component 137, which can implement the defect detection described herein during an erase operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
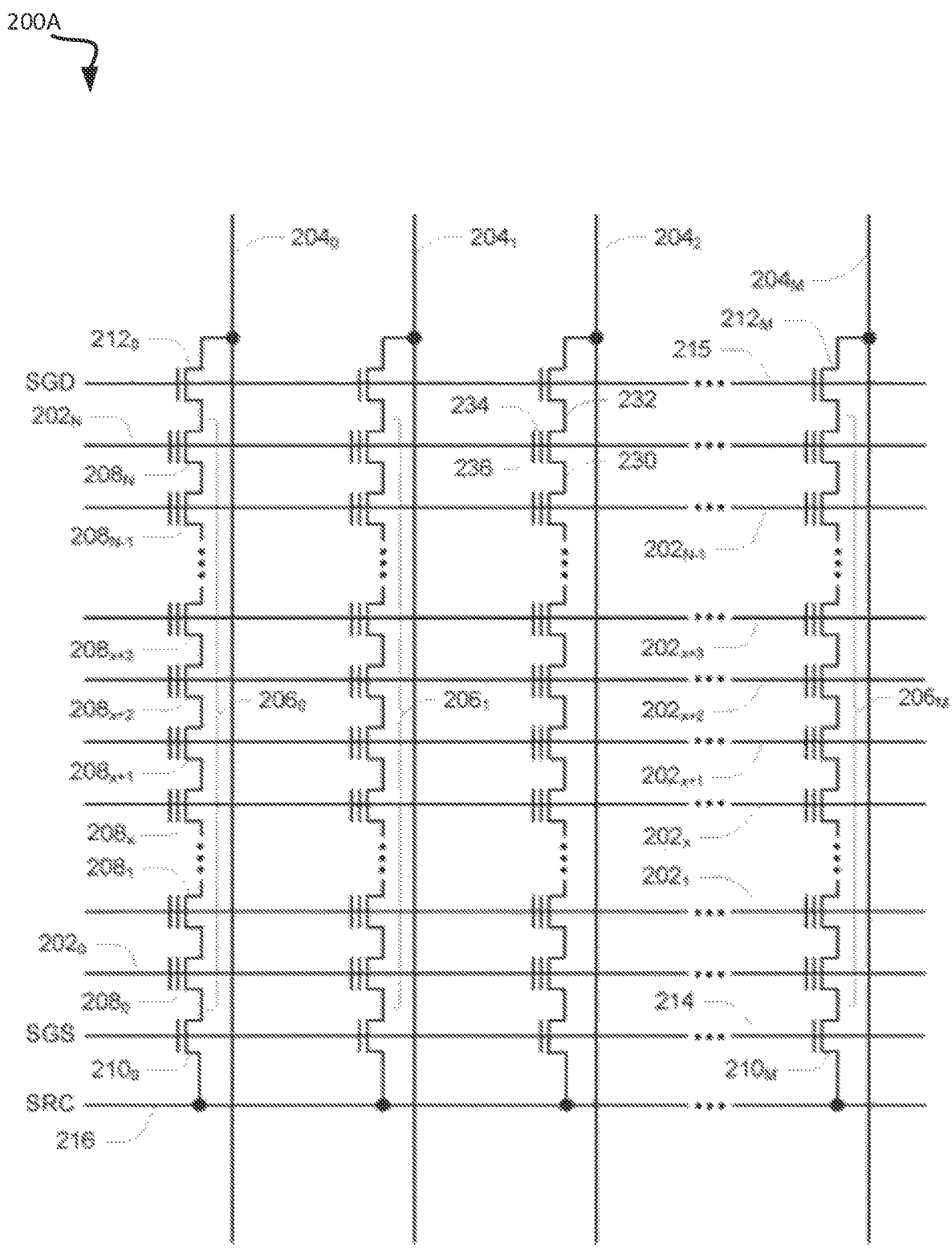
FIGS. 2A-2C are diagrams of portions of an example array of memory cells included in a memory device, in accordance with some embodiments of the present disclosure.
Figure 2B:
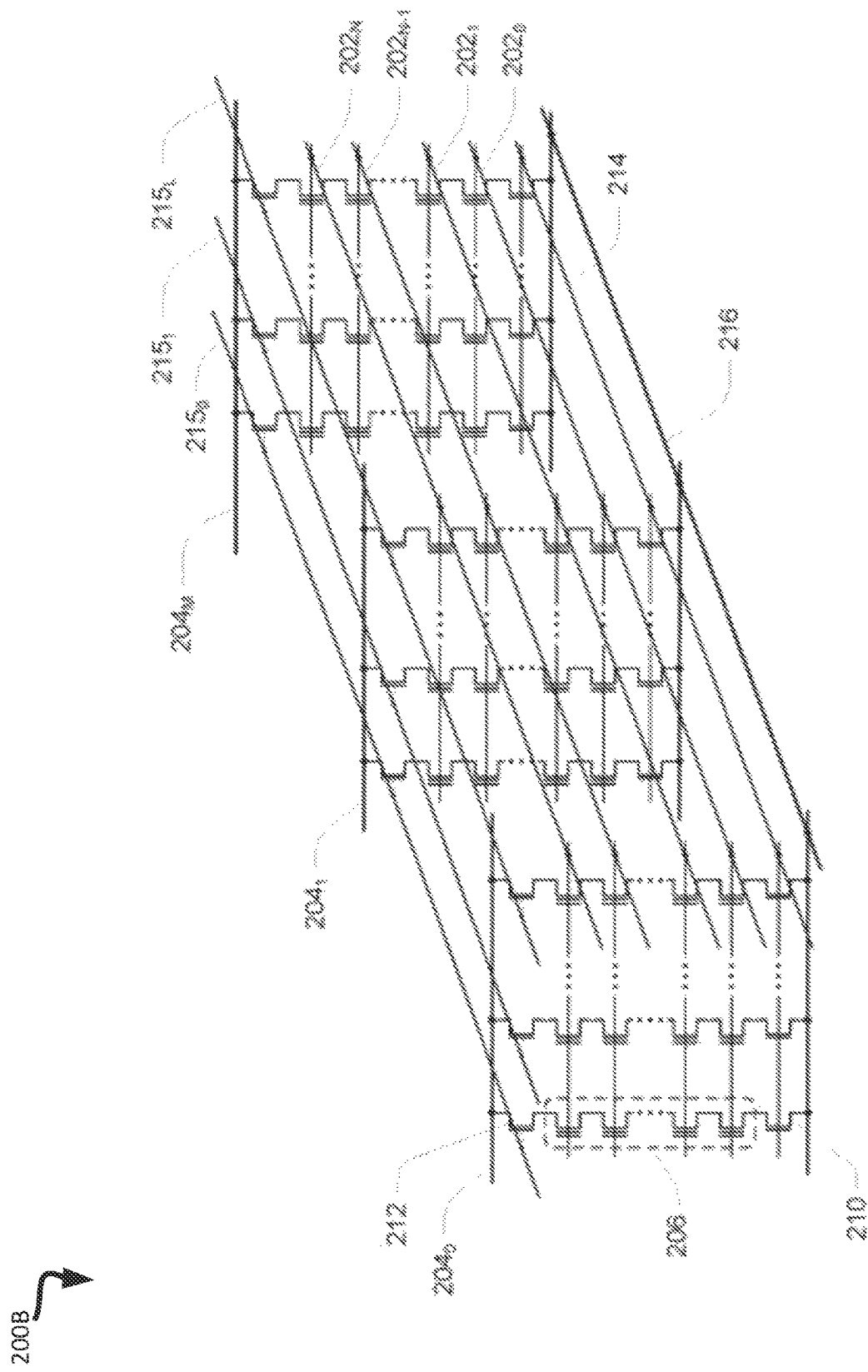
Figure 2C:
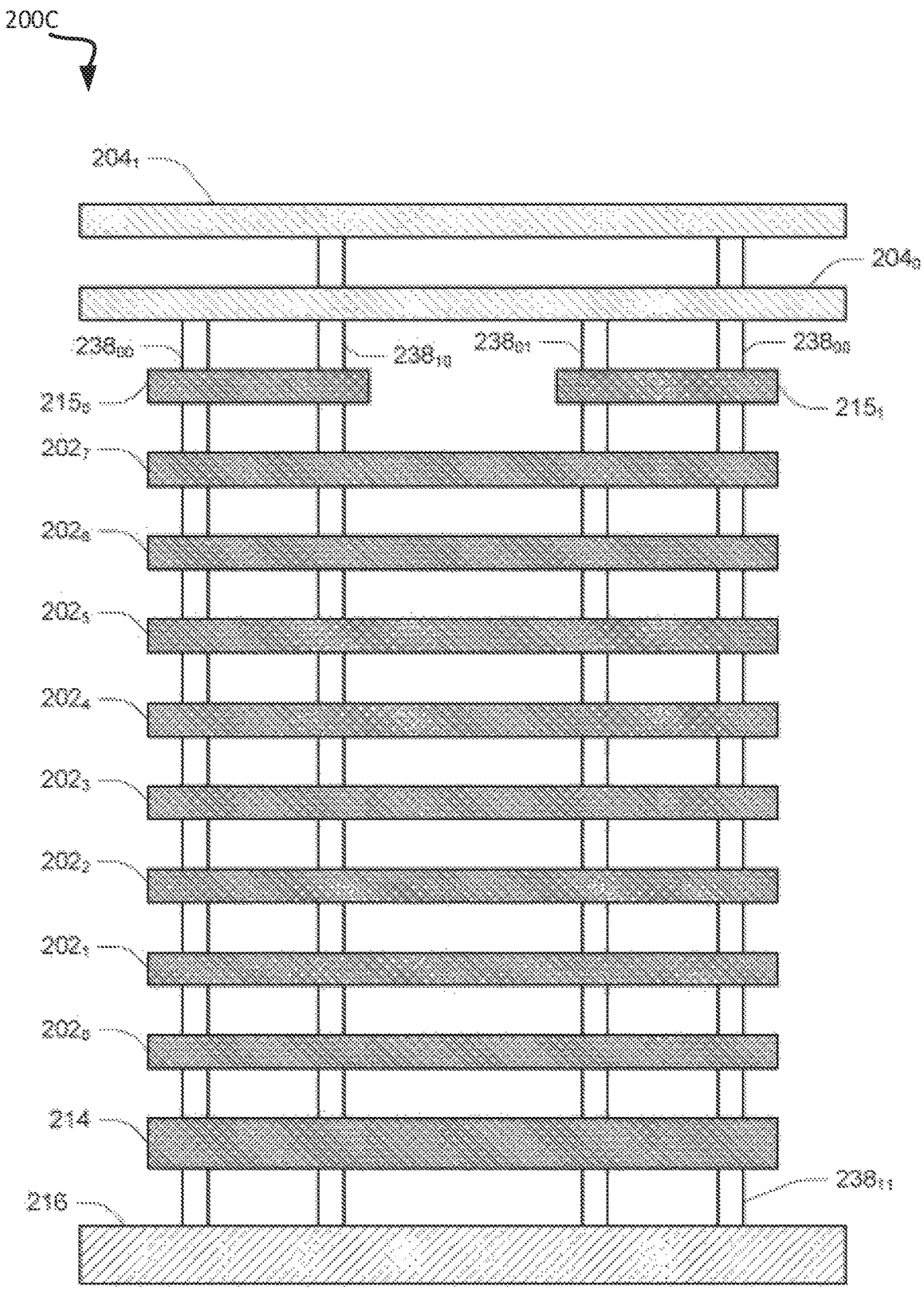

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines $215_0$-$215_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of an wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

Figure 3:
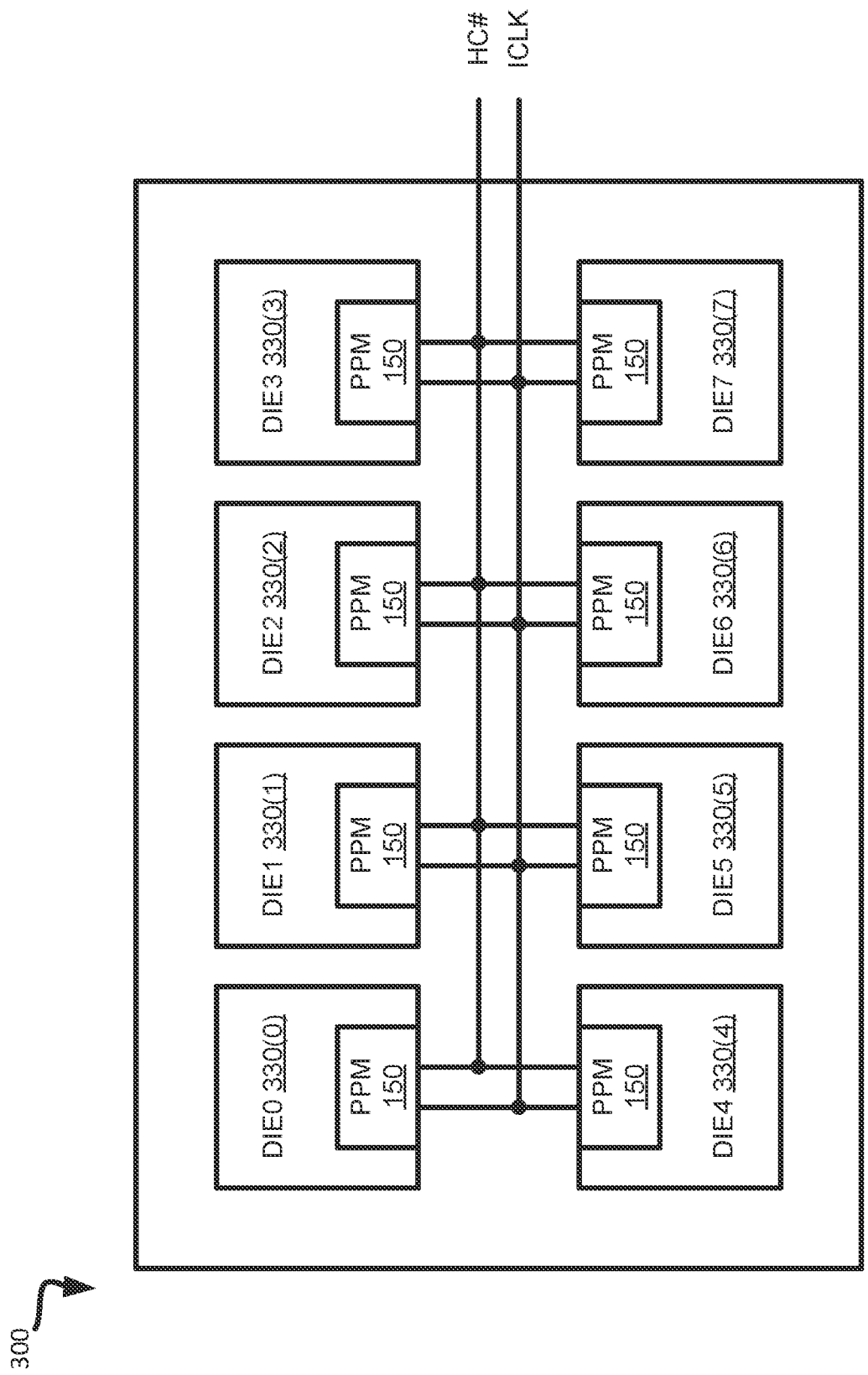
FIG. 3 is a block diagram illustrating a multi-die package with multiple memory dies in a memory sub-system, in accordance with some embodiments of the present disclosure.

FIG. 3 is a block diagram illustrating a multi-die package 300 with multiple memory dies in a memory sub-system, in accordance with some embodiments of the present disclosure. As illustrated, multi-die package 300 includes memory dies 330(0)-330(7). In other embodiments, however, multi-die package 300 can include some other number of memory dies, such as additional or fewer memory dies. In one embodiment, memory dies 330(0)-330(7) share a clock signal ICLK which is received via a clock signal line. Memory dies 330(0)-330(7) can be selectively enabled in response to a chip enable signal (e.g. via a control link), and can communicate over a separate I/O bus. In addition, a peak current magnitude indicator signal HC # is commonly shared between the memory dies 330(0)-330(7). The peak current magnitude indicator signal HC # can be normally pulled to a particular state (e.g., pulled high). In one embodiment, each of memory dies 330(0)-330(7) includes an instance of PPM component 137, which receives both the clock signal ICLK and the peak current magnitude indicator signal HC #.

In one embodiment, a token-based protocol is used where a token cycles through each of the memory dies 330(0)-330(7) for determining and broadcasting expected peak current magnitude, even though some of the memory dies 330(0)-330(7) might be disabled in response to their respective chip enable signal. The period of time during which a given PPM component 137 holds this token (e.g. a certain number of cycles of clock signal ICLK) can be referred to herein as a power management cycle of the associated memory die. At the end of the power management cycle, the token is broadcast to the other memory dies. Eventually the token is received again by the same PPM component 137, which signals the beginning of the power management cycle for the associated memory die. In one embodiment, the encoded value for the lowest expected peak current magnitude is configured such that each of its digits correspond to the normal logic level of the peak current magnitude indicator signal HC # where the disabled dies do not transition the peak current magnitude indicator signal HC #. In other embodiments, however, the memory dies can be configured, when otherwise disabled in response to their respective chip enable signal, to drive transitions of the peak current magnitude indicator signal HC # to indicate the encoded value for the lowest expected peak current magnitude upon being designated. When a given PPM component 137 holds the token, it can determine the peak current magnitude for the respective one of memory die 330(0)-330(7), which can be attributable to one or more processing threads on that memory die, and broadcast an indication of the same via the peak current magnitude indicator signal HC #. During a given power management cycle, the PPM component 137 can arbitrate among the multiple processing threads on the respective memory die using one of a number of different arbitration schemes in order to allocate that peak current to enable concurrent memory access operations.

Figure 4:
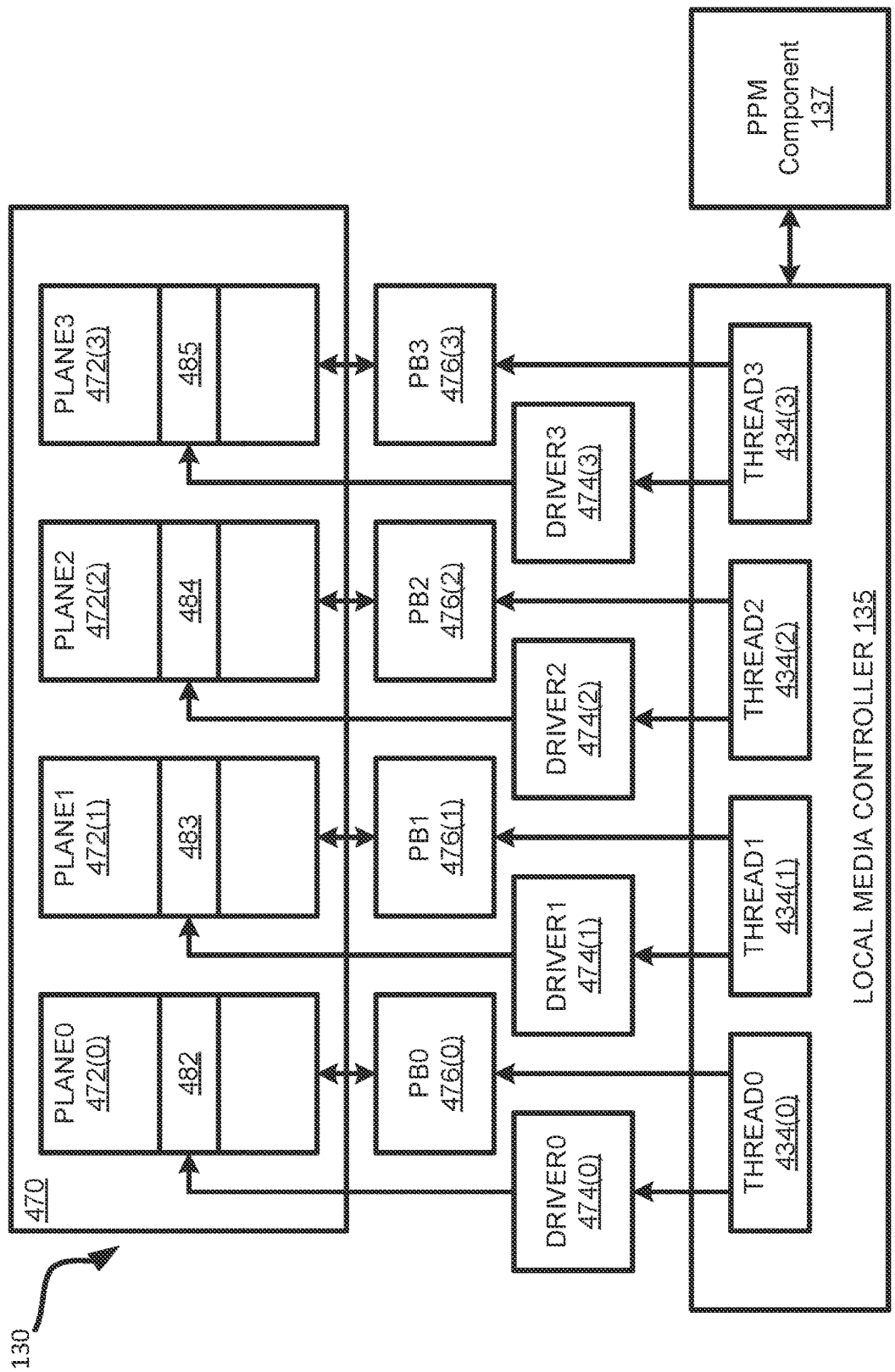
FIG. 4 is a block diagram illustrating a multi-plane memory device 130 configured for independent parallel plane access, in accordance with some embodiments of the present disclosure.

FIG. 4 is a block diagram illustrating a multi-plane memory device 130 configured for independent parallel plane access, in accordance with some embodiments of the present disclosure. The memory planes 472(0)-472(3) can each be divided into blocks of data, with a different relative block of data from two or more of the memory planes 472(0)-472(3) concurrently accessible during memory access operations. For example, during memory access operations, two or more of data block 482 of the memory plane 472(0), data block 483 of the memory plane 472(1), data block 484 of the memory plane 372(2), and data block 485 of the memory plane 4372(3) can each be accessed concurrently.

The memory device 130 includes a memory array 470 divided into memory planes 472(0)-472(3) that each includes a respective number of memory cells. The multi-plane memory device 130 can further include local media controller 135, including a power control circuit and access control circuit for concurrently performing memory access operations for different memory planes 472(0)-472(3). The memory cells can be non-volatile memory cells, such as NAND flash cells, or can generally be any type of memory cells.

The memory planes 472(0)-472(3) can each be divided into blocks of data, with a different relative block of data from each of the memory planes 472(0)-472(3) concurrently accessible during memory access operations. For example, during memory access operations, data block 482 of the memory plane 472(0), data block 383 of the memory plane 472(1), data block 484 of the memory plane 472(2), and data block 385 of the memory plane 472(3) can each be accessed concurrently.

Each of the memory planes 472(0)-372(3) can be coupled to a respective page buffer 476(0)-476(3). Each page buffer 476(0)-376(3) can be configured to provide data to or receive data from the respective memory plane 472(0)-472 (3). The page buffers 476(0)-476(3) can be controlled by local media controller 135. Data received from the respective memory plane 472(0)-472(3) can be latched at the page buffers 476(0)-476(3), respectively, and retrieved by local media controller 135, and provided to the memory sub-system controller 115 via the NVMe interface.

Each of the memory planes 472(0)-472(3) can be further coupled to a respective access driver circuit 474(0)-474(3), such as an access line driver circuit. The driver circuits 474(0)-474(3) can be configured to condition a page of a respective block of an associated memory plane 472(0)-472 (3) for a memory access operation, such as programming data (i.e., writing data), reading data, or erasing data. Each of the driver circuits 474(0)-474(3) can be coupled to a respective global access lines associated with a respective memory plane 472(0)-472(3). Each of the global access lines can be selectively coupled to respective local access lines within a block of a plane during a memory access operation associated with a page within the block. The driver circuits 474(0)-474(3) can be controlled based on signals from local media controller 135. Each of the driver circuits 474(0)-474(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 474(0)-474(3) and page buffers 476(0)-476(3) to concurrently perform memory access operations associated with each of a group of memory command and address pairs (e.g., received from memory sub-system controller 115). For example, local media controller 135 can control the driver circuits 474(0)-474(3) and page buffer 476(0)-476(3) to perform the concurrent memory access operations. Local media controller 135 can include a power control circuit that serially configures two or more of the driver circuits 474 (0)-474(3) for the concurrent memory access operations, and an access control circuit configured to control two or more of the page buffers 476(0)-476(3) to sense and latch data from the respective memory planes 472(0)-472(3), or program data to the respective memory planes 472(0)-472(3) to perform the concurrent memory access operations.

In operation, local media controller 135 can receive a group of memory command and address pairs via the NVMe or ONFI bus, with each pair arriving in parallel or serially. In some examples, the group of memory command and address pairs can each be associated with different respective memory planes 472(0)-472(3) of the memory array 470. The local media controller 135 can be configured to perform concurrent memory access operations (e.g., read operations or program operations) for the different memory planes 472(0)-472(3) of the memory array 470 responsive to the group of memory command and address pairs. For example, the power control circuit of local media controller 135 can serially configure, for the concurrent memory access operations based on respective page type (e.g., UP, TP, LP, XP, SLC/MLC/TLC/QLC page), the driver circuits 474(0)-474 (3) for two or more memory planes 472(0)-472(3) associated with the group of memory command and address pairs. After the access line driver circuits 474(0)-474(3) have been configured, the access control circuit of local media controller 135 can concurrently control the page buffers 476 (0)-476(3) to access the respective pages of each of the two or more memory planes 472(0)-472(3) associated with the group of memory command and address pairs, such as retrieving data or writing data, during the concurrent memory access operations. For example, the access control circuit can concurrently (e.g., in parallel and/or contemporaneously) control the page buffers 476(0)-476(3) to charge/discharge bitlines, sense data from the two or more memory planes 472(0)-472(3), and/or latch the data.

Based on the signals received from local media controller 135, the driver circuits 474(0)-474(3) that are coupled to the memory planes 472(0)-472(3) associated with the group of memory command and address command pairs can select blocks of memory or memory cells from the associated memory plane 472(0)-472(3), for memory operations, such as read, program, and/or erase operations. The driver circuits 474(0)-474(3) can drive different respective global access lines associated with a respective memory plane 472(0)-472 (3). As an example, the driver circuit 474(0) can drive a first voltage on a first global access line associated with the memory plane 472(0), the driver circuit 474(1) can drive a second voltage on a third global access line associated with the memory plane 472(1), the driver circuit 474(2) can drive a third voltage on a seventh global access line associated with the memory plane 472(2), etc., and other voltages can be driven on each of the remaining global access lines. In some examples, pass voltages can be provided on all access lines except an access line associated with a page of a memory plane 472(0)-472(3) to be accessed. The local media controller 135, the driver circuits 474(0)-474(3) can allow different respective pages, and the page buffers 476 (0)-476(3) within different respective blocks of memory cells, to be accessed concurrently. For example, a first page of a first block of a first memory plane can be accessed concurrently with a second page of a second block of a second memory plane, regardless of page type.

The page buffers 476(0)-476(3) can provide data to or receive data from the local media controller 135 during the memory access operations responsive to signals from the local media controller 135 and the respective memory planes 472(0)-472(3). The local media controller 135 can provide the received data to memory sub-system controller 115.

It will be appreciated that the memory device 130 can include more or less than four memory planes, driver circuits, and page buffers. It will also be appreciated that the respective global access lines can include 8, 16, 32, 64, 128, etc., global access lines. The local media controller 135 and the driver circuits 474(0)-474(3) can concurrently access different respective pages within different respective blocks of different memory planes when the different respective pages are of a different page type. For example, local media controller 135 can include a number of different processing threads, such as processing threads 434(0)-434(3). Each of processing threads 434(0)-434(3) can be associated with a respective one of memory planes 472(0)-472(3), or a respective group of memory planes, and can manage operations performed on the respective plane or group of planes. For example, each of processing threads 434(0)-434(3) can provide control signals to the respective one of driver circuits 474(0)-474(3) and page buffers 476(0)-476(3) to perform those memory access operations concurrently (e.g., at least partially overlapping in time). Since the processing threads 434(0)-434(3) can perform the memory access operations, each of processing threads 434(0)-434(3) can have different current requirements at different points in time. PPM component 137 can determine the power budget needs of processing threads 434(0)-334(3) in a given power management cycle and identify one or more of processing threads 434(0)-434(3) using one of a number of power budget arbitration schemes described herein. The one or more processing threads 434(0)-434(3) can be determined based on an available power budget in the memory subsystem 110 during the power management cycles. For example, PPM component 137 can determine respective priorities of processing threads 434(0)-434(3), and allocate current to processing threads 434(0)-434(3) based on the respective priorities.

Figure 5:
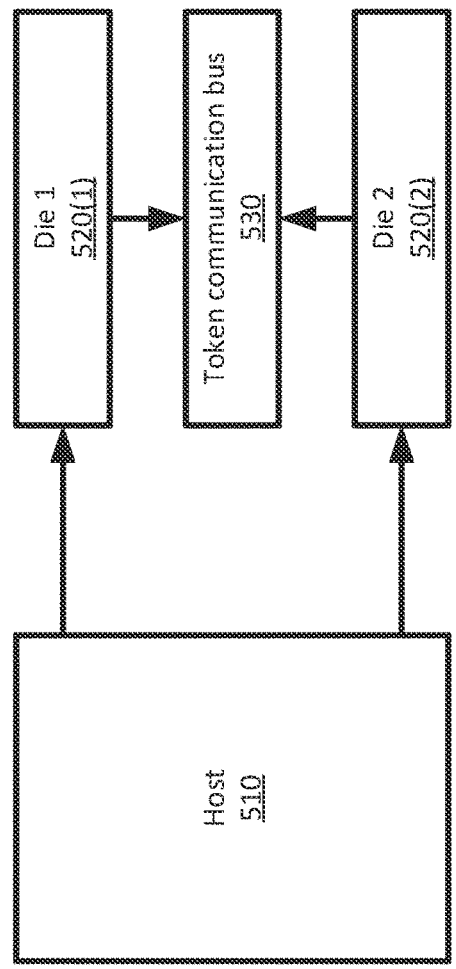
FIG. 5 is a block diagram of an example system illustrating an overview of an implementation of peak power management in a memory device during suspend status, in accordance with some embodiments of the present disclosure.

FIG. 5 is a block diagram of an example system 500 illustrating an overview of an implementation of peak power management in a memory device during suspend status, in accordance with some embodiments of the present disclosure. As shown, the system 500 includes a host 510 (e.g., the memory sub-system controller 115 of FIG. 1), a number of dies including die 1 520(1) and die 2 520(2), and a token communication bus 530. In this illustrative example, die 1 520(1) has a suspend status (e.g., program/erase/nested suspend status) and die 2 520(2) has an active status in which die 2 520(2) can handle a command (e.g., program/read/erase).

The host 510 can perform PPM initialization with respect to each of the dies. In some embodiments, the host 510 issues respective set feature commands to the dies during PPM initialization. When enabled, the set feature can enable die 1 520(1) to reserve current budget while in the suspend status, which can then be released upon entering the resume status.

The first and second dies 520(1) and 520(2) can communicate current budget reservations via the token communication bus 530 using respective first and second tokens. More specifically, the token of die 1 520(1) can be used to reserve a current budget for a first command to be handled by die 1 520(1) upon resuming functionality. In some embodiments, the first command is a predicted command. For example, if the first command is an iWL read command, then the first token can be used to reserve a current budget of 100 mA. The token of die 2 520(2) can be used to reserve a current budget for a command handled by die 2 520(2). For example, if the second command is an erase command, then the second token can be used to reserve a current budget for die 1 520(2) of 150 mA. As another example, if the second command is a read command, then the second token can be used to reserve a current budget for die 1 520(2) of 50 mA. As yet another example, if the second command is a program command, then the second token can be used to reserve a current budget for die 1 520(2) of 75 mA. Further details regarding the budget reservation process will now be described below with respect to FIGS. 6-8.

Figure 6A:
FIGS. 6A-6C are block diagrams illustrating current budget reservation during suspend status to implement peak power management in a memory device, in accordance with some embodiments of the present disclosure.
Figure 6A:
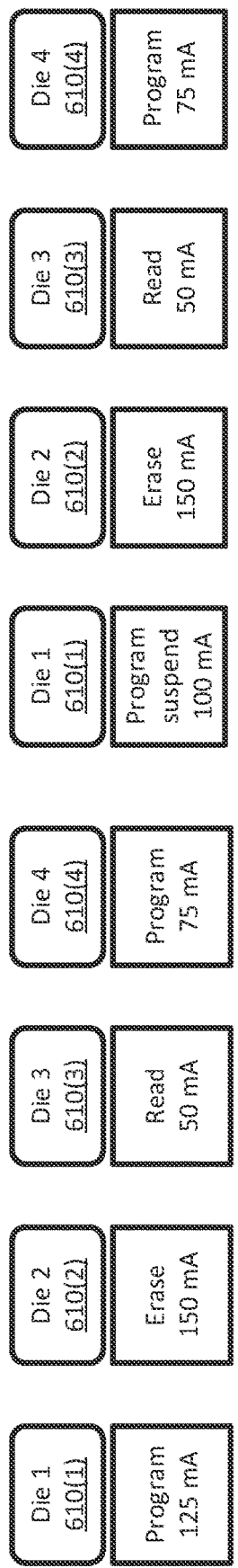
Figure 6B:
Figure 6C:
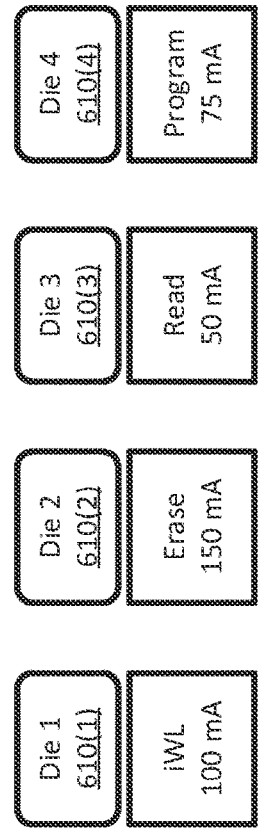

FIGS. 6A-6C are block diagrams of a system 600 illustrating current budget reservation during suspend status to implement peak power management in a memory device, in accordance with some embodiments of the present disclosure. The system 600 includes a number of dies, including die 1 610(1), die 2 610(2), die 3 610(3) and die 4 610(4). It is assumed that the total current budget that can be shared among the dies is 400 mA.

For example, FIG. 6A illustrates an initial state of the system 600. In the initial state of the system, each of the dies 1 610(1) through die 4 610(4) is in an active status for handling a respective command. Illustratively, die 1 610(1) is handling a program command to execute a program operation having a corresponding current budget of 125 mA, die 2 610(2) is handling an erase command to execute an erase operation having a corresponding current budget of 150 mA, die 3 610(3) is handling a read command to execute a read operation having a corresponding current budget of 50 mA, and die 4 610(4) is handling a program command to execute a program operation having a corresponding current budget of 75 mA.

Turning to FIG. 6B, die 1 610(1) is placed into a suspended state in which execution of the program operation is suspended, while die 2 610(2) through die 4 610(4) remain in an active state for executing their respective media access operations. Illustratively, the PPM component of die 1 610(1) receives a request to reserve 100 mA for a pair of incoming iWL read commands determined (e.g., predicted) to be handled upon resuming functionality. For example, at least one set feature command can be used to reserve the current budget for die 1 610(1) while in the suspended state. The 100 mA can be obtained from the current budget of 125 mA that was being used to execute the now-suspended program operation, while the remaining 25 mA can be released to the other dies (e.g., dies 610(1) through 610(4)).

Turning to FIG. 6C, die 1 610(1) is handling the pair of iWL read commands by executing respective iWL read operations. The pair of iWL read commands can be handled simultaneously or sequentially. Since the current budget for handling the pair of iWL read commands was reserved for die 1 610(1) upon entering the program suspended state, die 1 610(1) does not have to wait for the other dies to release their budget in order to execute the iWL read operations. Accordingly, the pair of iWL commands can be handled immediately without having to wait for the other dies to release current budget.

In some instances, the reserved budget is less than the current budget that is needed by the corresponding memory die to handle commands in accordance with the specification. For example, there may not be enough available current budget within the multi-die memory device to grant the full requested amount of current budget, and the die is granted a portion of the requested amount of current budget. As another example, there may be a maximum allowable current budget that can be reserved by each PPM component to enable processing efficiency balancing with respect to the other dies of the multi-die memory device. Thus, if there are changes to the specification that introduce additional command(s), the suspended die may not be able to reserve enough current budget to handle all requests in accordance with the specification. As will now be described below with reference to FIG. 7, the processing logic can implement a current budget arbitration process in order to determine how to handle requests in view of the reserved current budget.

Figure 7:
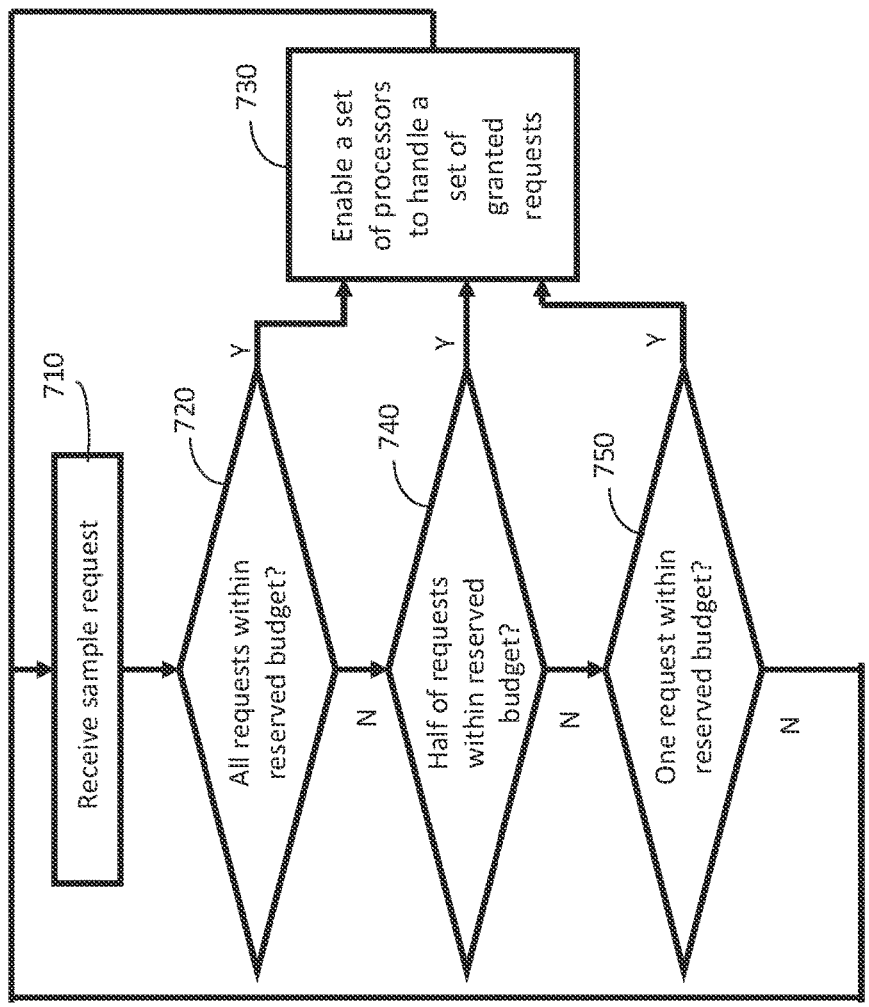
FIG. 7 is a flow diagram of a method to implement current budget arbitration logic with respect to a reserved current budget, in accordance with some embodiments of the present disclosure.

FIG. 7 is a flow diagram of a method 700 to implement current budget arbitration logic with respect to a reserved current budget, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the PPM component 137 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, a sample request is received. For example, processing logic can receive the sample request. The sample request can include a number of processor requests ("requests") with respect to a particular die. For example, the requests can include at least one main processor request and/or at least one coprocessor request. Each request can correspond to a respective current budget for handling the request.

At operation 720, a determination is made. For example, the processing logic can determine whether all of the requests are within a reserved current budget ("reserved budget"). As described above, the reserved budget can, in some instances, be less than the amount of current budget needed to handle all of the requests. For example, the processing logic can identify a total current budget for all of the requests, and compare the total current budget to the reserved budget to determine whether the total current budget is less than or equal to the reserved budget.

If so, this means that the reserved budget is sufficient to handle all of the requests. That is, all of the processors are qualified to handle their respective request(s). Thus, at operation 730, a set of processors is enabled to handle a set of granted requests. For example, the set of processors can include all of the processors and the set of granted requests can include all of the requests, and the processing logic can enable all of the processors to handle each of their respective request(s).

If all the requests are not within the reserved budget, then, at operation 740, another determination is made. For example, the processing logic can determine whether half of the requests are within the reserved budget. For example, the processing logic can determine whether there exists a set of requests made up of half of the requests received at operation 710, such that the set of requests has a total current budget less than or equal to the reserved budget. If so, this means that the reserved budget is sufficient to handle the set of requests, and the set of granted requests includes the set of requests. Thus, the process reverts to operation 730 to enable the set of processors to handle the set of requests.

If half of the requests are not in the reserved budget (e.g., the set of requests does not exist), then, at operation 750, another determination is made. For example, the processing logic can determine whether a single request is within the reserved budget. In some embodiments, the processing logic determines whether there exists one request that has a current budget less than or equal to the reserved budget. If so, this means that the reserved budget is sufficient to handle the single request, and the set of granted requests includes the single request. Thus, the process reverts to operation 730 to enable the set of processors to handle the single request.

If there are no requests that are within the reserved budget, this means that the reserved budget was determined (e.g., predicted) to be too small. The processing logic may have to wait for additional budget to be released from at least one other die in order to handle one or more of the requests.

Figure 8:
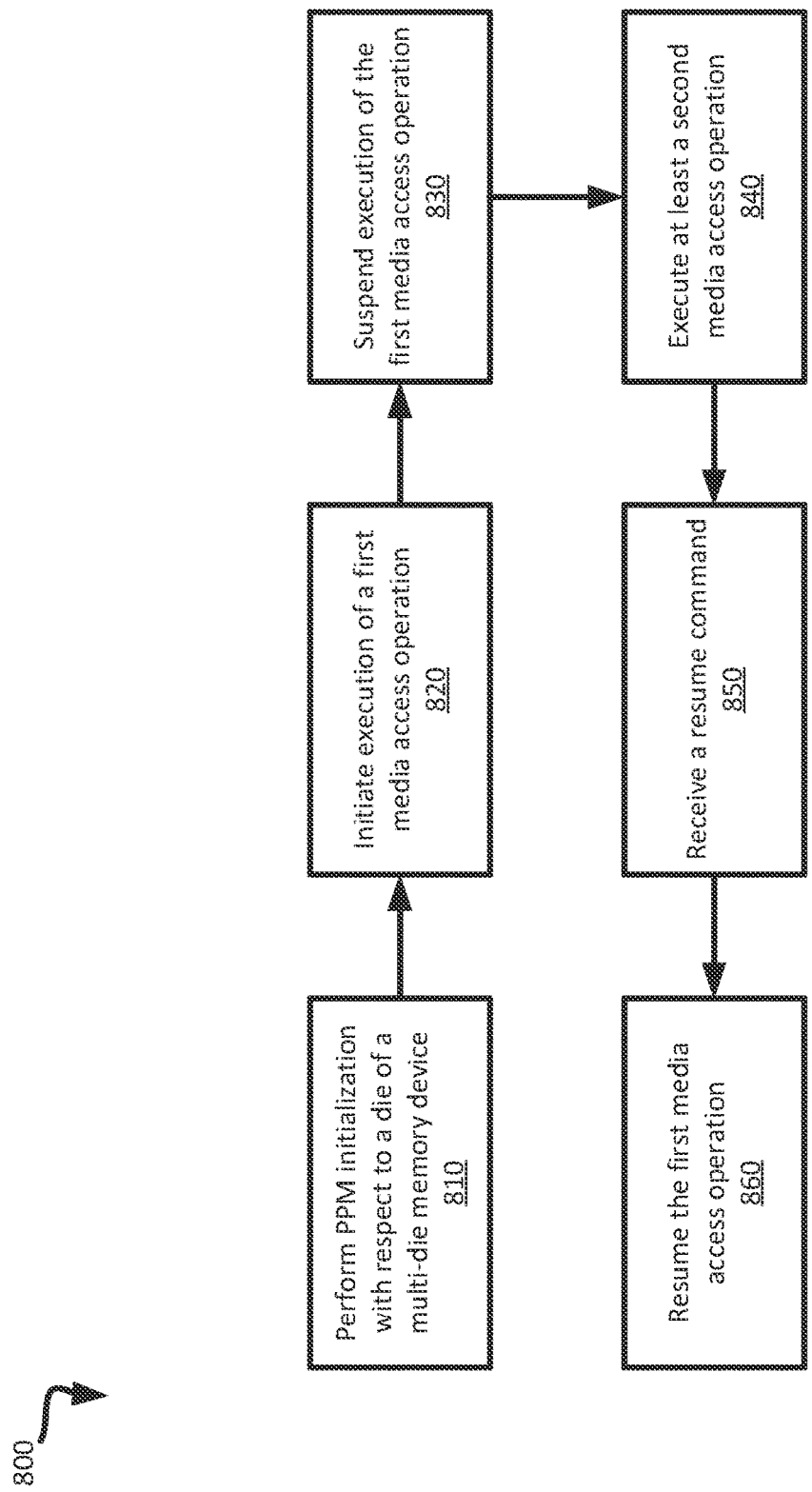
FIG. 8 is a flow diagram of a method to implement peak power management in a memory device during suspend status, in accordance with some embodiments of the present disclosure

FIG. 8 is a flow diagram of a method 800 to implement peak power management during suspend status in a memory device, in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the PPM component 137 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, PPM initialization is performed with respect to a die of a multi-die memory device. For example, processing logic can perform the PPM initialization with respect to the die to enable reservation of a current budget. The processing logic can communicate with PPM components of other dies of the memory device to implement PPM via a token communication bus. In some embodiments, performing the PPM initialization includes enabling a set feature. Enabling the set feature can include receiving a budget reservation set feature command from a memory sub-system controller (e.g., the memory sub-system controller 115).

For example, the memory sub-system controller can issue, for each die, a sequence of set feature commands to configure PPM settings for the die. The sequence of set feature commands can configure the allowable current budget for the dies, mapping the dies to respective "turns" in which the dies can broadcast their current budget, the primary die that drives the clock signal (e.g., iCLK signal), set which operations that PPM will operate on, etc. Accordingly, the sequence of set feature commands received from the memory sub-system can include the budget reservation set feature command. Further details regarding operation 810 are described above with reference to FIG. 5.

At operation 820, execution of a first media access operation is initiated. For example, the processing logic can receive a first command from the memory sub-system controller to perform the first media access operation, and initiate execution of the first media operation with respect to the die. In some embodiments, the first media access operation is a programming operation.

At operation 830, execution of the first media access operation is suspended. For example, the processing logic can cause the die to be placed in a suspended state to suspend execution of the first media access operation with a reserved current budget. For example, if the first media access operation is a programming operation, then the die can be placed in a program suspended state. The die can be placed in a suspended state in response to receiving a suspend command from a memory sub-system controller.

The reserved current budget can be stored in a configurable register. The reserved current budget can be obtained by reserving at least a portion of the previous current budget used by the die prior to being suspended. However, if the die wants to reserve current budget in excess of the previous current budget, this can introduce delays as the die requests the extra current budget from the other dies. For example, the die wants to reserve 150 mA instead of 100 mA in the above example, then the die will have to request the extra 25 mA to add to the previous current budget from the other dies. Accordingly, to improve efficiency, the maximum current budget that can be reserved by the die can be the previous current budget, such that the reserved current budget is less than or equal to the previous current budget.

Additional current budget reservation restrictions can be provided to enable processing balancing and further improve efficiency among all dies of the multi-die memory device. For example, another restriction can be that the maximum current budget that can be reserved is a percentage of the total current budget. More specifically, the percentage can be determined in view of the number of dies of the multi-die memory device. Illustratively, if the multi-die memory device includes 4 dies, then the maximum current budget that can be reserved can be 25% of the total current budget.

For example, if the total current budget is 400 mA, the maximum current budget that can be reserved is 100 mA. As another example, the multi-die memory device includes 8 dies, the maximum current budget can be 12.5% of the total current budget. Accordingly, if the previous current budget claimed by the die is 125 mA, but the reserved current budget is 100 mA, then the die may have to release 25 mA to the other dies while suspended.

At operation 840, at least a second media access operation is executed. For example, the processing logic can receive a set of requests from the memory sub-system controller to execute at least the second media access operation, and handle the set of requests. in response to receiving the command. The second media access operation can be more urgent or higher priority relative to the first media access operation. In some embodiments, the second media access operation is a read operation. In some embodiments, the second media access operation is an iWL read operation. The one or more commands can include one or more commands corresponding to a main processor and one or more commands corresponding to one or more coprocessors.

Since the die had reserved current budget to account for the one more commands when the first media access operation was suspended, the die can immediately initiate execution of the one or more commands without waiting for additional current budget to be released. However, in some instances, the reserved current budget is less than the current budget that is needed to handle each of the one or more media access operations. To address this situation, the processing logic can handle the set of requests by implementing current budget arbitration logic with respect to the reserved current budget. Further details regarding implementing current budget arbitration logic are described above with reference to FIG. 7.

At operation 850, a resume command is received. For example, the processing logic can receive the resume command from the memory sub-system controller after handling the set of requests. More specifically, the memory sub-system controller can decide whether to resume the first media access operation command after the execution of the at least second media access operation, and issue the resume command in response to determining to resume the first media access operation.

At operation 860, the first media access operation is resumed. For example, the processing logic can cause the first media access operation to be resumed. Causing the first media access operation to be resumed can include placing the die in a resumed state to resume execution of the first media access operation. Further details regarding operations 810-860 are described above with reference to FIGS. 1 and 5-7.

Figure 9:
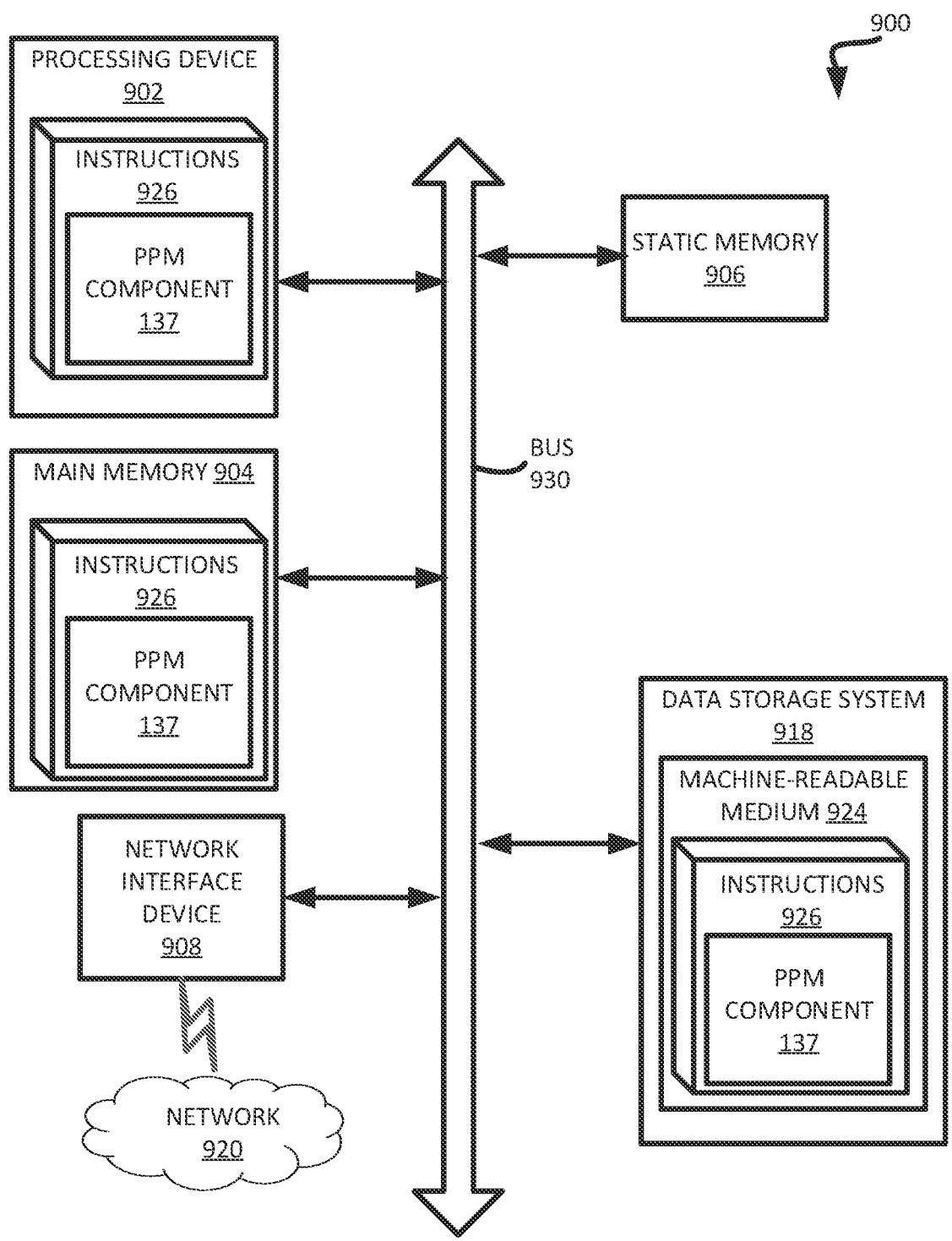
FIG. 9 is a block diagram of an example computer system in which embodiments of the present disclosure may operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the PPM component 137 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or RDRAM, etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1A.

In one embodiment, the instructions 926 include instructions to implement functionality corresponding to a PPM component (e.g., the PPM component 137 of FIG. 1A). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for performing peak power management (PPM) operations in a memory device, the method comprising:
   assigning, by a processing device to a memory die of a multi-die memory device, a reserved current budget determined based on predicted current consumption, wherein the reserved current budget is allocated to the memory die upon the memory die being placed in a suspended state;
   causing, by the processing device, the memory die to be placed in the suspended state to suspend execution of a first media access operation;
   receiving, by the processing device, a set of requests to execute at least a second media access operation during the suspended state; and
   in response receiving the set of requests, handling, by the processing device, the set of requests by implementing current budget arbitration logic based on a number of requests of the set of requests that have a request current budget that is less than or equal to the reserved current budget.

2. The method of claim 1, wherein the reserved current budget is determined in accordance with a memory device specification defining a target delay.

3. The method of claim 1, further comprising performing, by the processing device, PPM initialization with respect to the memory die to enable reservation of the reserved current budget, wherein performing PPM initialization comprises receiving a set feature command to enable the reservation of the reserved current budget.

4. The method of claim 1, wherein the first media access operation comprises at least one of: a program command or an erase command, and wherein the second media access operation comprises at least one of: a read command or an independent wordline read command.

5. The method of claim 1, further comprising:
   after handling the set of requests, receiving, by the processing device, a resume command; and
   in response to receiving the resume command, causing, by the processing device the first media access operation to be resumed.

6. The method of claim 1, wherein:
   the number of requests having a request current budget less than or equal to the reserved current budget is a total number of requests of the set of requests; and
   handling the set of requests by implementing current budget arbitration logic based on the number of requests having a request current budget less than or equal to the reserved current budget further comprises enabling a set of processors to handle the set of requests.

7. The method of claim 1, wherein:
   the number of requests having a request current budget less than or equal to the reserved current budget is half of a total number of requests of the set of requests;
   each request having a request current budget less than or equal to the reserved current budget is comprised within a subset of the set of requests; and
   handling the set of requests by implementing current budget arbitration logic based on the number of requests having a request current budget less than or equal to the reserved current budget further comprises enabling a set of processors to handle the subset.

8. The method of claim 1, wherein:
the number of requests having a request current budget less than or equal to the reserved current budget is a single request of the set of requests, and handling the set of requests by implementing current budget arbitration logic with respect to the reserved current budget further comprises enable a processing to handle the single request; or
the number of requests having a request current budget less than or equal to the reserved current budget is zero, and handling the set of requests by implementing current budget arbitration logic based on the number of requests having a request current budget less than or equal to the reserved current budget further comprises causing a delay to handle at least one request of the set of requests.

9. A memory device comprising:
a plurality of memory dies, each memory die of the plurality of memory dies comprising:
  a memory array; and
  control logic, operatively coupled with the memory array, to perform peak power management (PPM) operations comprising:
    assigning, to a memory die of the plurality of memory dies, a reserved current budget determined based on predicted current consumption, wherein the reserved current budget is allocated to the memory die upon the memory die being placed in a suspended state;
    causing the memory die to be placed in the suspended state to suspend execution of a first media access operation;
    receiving a set of requests to execute at least a second media access operation during the suspended state; and
    in response receiving the set of requests, handling the set of requests by implementing current budget arbitration logic based on a number of requests of the set of requests that have a request current budget that is less than or equal to the reserved current budget.

10. The memory device of claim 9, wherein the reserved current budget is determined in accordance with a memory device specification defining a target delay.

11. The memory device of claim 9, wherein the PPM operations further comprise performing PPM initialization with respect to the memory die to enable reservation of the reserved current budget, and wherein performing PPM initialization comprises receiving a set feature command to enable the reservation of the reserved current budget.

12. The memory device of claim 9, wherein the first media access operation comprises at least one of: a program command or an erase command, and wherein the second media access operation comprises at least one of: a read command or an independent wordline read command.

13. The memory device of claim 9, wherein the operations further comprise:
after handling the set of requests, receiving a resume command; and
in response to receiving the resume command, causing the first media access operation to be resumed.

14. The memory device of claim 9, wherein:
the number of requests having a request current budget less than or equal to the reserved current budget is a total number of requests of the set of requests; and
handling the set of requests by implementing current budget arbitration logic based on the number of requests having a total current budget less than or equal to the reserved current budget further comprises enabling a set of processors to handle the set of requests.

15. The memory device of claim 9, wherein:
the number of requests having a request current budget less than or equal to the reserved current budget is half of a total number of requests of the set of requests;
each request having a request current budget less than or equal to the reserved current budget is comprised within a subset of the set of requests; and
handling the set of requests by implementing current budget arbitration logic based on the number of requests having a request current budget less than or equal to the reserved current budget further comprises enabling a set of processors to handle the subset.

16. The memory device of claim 9, wherein:
the number of requests having a request current budget less than or equal to the reserved current budget is a single request of the set of requests, and handling the set of requests by implementing current budget arbitration logic based on the number of requests having a request current budget less than or equal to the reserved current budget further comprises enabling a processor to handle the single request; or
the number of requests having a request current budget less than or equal to the reserved current budget is zero, and handling the set of requests by implementing current budget arbitration logic based on the number of requests having a request current budget less than or equal to the reserved current budget further comprises causing a delay to handle at least one request of the set of requests.

17. A memory device comprising:
a plurality of memory dies, each memory die of the plurality of memory dies comprising:
  a memory array; and
  control logic, operatively coupled with the memory array, to perform peak power management (PPM) operations comprising:
    performing PPM initialization to enable reservation of a reserved current budget with respect to a memory die of the plurality of memory dies, wherein the reserved current budget is allocated to the memory die upon the memory die being placed in a suspended state, wherein the reserved current budget is reserved in accordance with a set of requests defined for a memory device specification, wherein the set of requests is handled by implementing current budget arbitration logic based on a number of requests of the set of request that have a request current budget that is less than or equal to the reserved current budget, and wherein the memory device specification further defines at least a target delay for the memory device;
    initiating execution of a first media access operation; and
    causing the memory die to be placed in the suspended state to suspend execution of the first media access operation with the reserved current budget.

18. The memory device of claim 17, wherein performing PPM initialization comprises receiving a set feature command to enable the reservation of the reserved current budget.

19. The memory device of claim 17, wherein the operations further comprise:
receiving a set of requests to execute at least a second media access operation during the suspended state;
in response receiving the set of requests, handling the set of requests by implementing the current budget arbitration logic based on the number of requests of the set of requests that have a request current budget that is less than or equal to the reserved current budget;
after handling the set of requests, receiving a resume command; and
in response to receiving the resume command, causing the first media access operation to be resumed.

20. The memory device of claim 19, wherein the first media access operation comprises at least one of: a program command or an erase command, and wherein the second media access operation comprises at least one of: a read command or an independent wordline read command.

* * * * *